(12) United States Patent
Oleson

(10) Patent No.: US 11,542,014 B2
(45) Date of Patent: *Jan. 3, 2023

(54) GRAVITY-ASSISTED TRACKING BASE ASSEMBLY FOR AIRCRAFT SEAT

(71) Applicant: Rockwell Collins, Inc., Cedar Rapids, IA (US)

(72) Inventor: Michael L. Oleson, Parkland, FL (US)

(73) Assignee: Rockwell Collins, Inc., Cedar Rapids, IA (US)

(*) Notice: Subject to any disclaimer, the term of this patent is extended or adjusted under 35 U.S.C. 154(b) by 124 days.

This patent is subject to a terminal disclaimer.

(21) Appl. No.: 17/221,079

(22) Filed: Apr. 2, 2021

(65) Prior Publication Data

US 2021/0221520 A1 Jul. 22, 2021

Related U.S. Application Data

(62) Division of application No. 15/702,324, filed on Sep. 12, 2017, now Pat. No. 11,338,922.

(51) Int. Cl.
*B64D 11/06* (2006.01)
*B60N 2/06* (2006.01)

(52) U.S. Cl.
CPC .......... *B64D 11/0696* (2013.01); *B60N 2/062* (2013.01); *B64D 11/0639* (2014.12); *B64D 11/0648* (2014.12); *B64D 11/064* (2014.12)

(58) Field of Classification Search
CPC .................................................. B64D 11/0696
See application file for complete search history.

(56) References Cited

U.S. PATENT DOCUMENTS 217,790 A * 7/1879 Foster ................ B60N 2/01583
248/503.1
5,441,129 A 8/1995 Porter et al.
(Continued)

FOREIGN PATENT DOCUMENTS

WO 2014115106 A1 7/2014
WO 2016049356 A1 3/2016
WO 2016065234 A1 4/2016

OTHER PUBLICATIONS

Code of Federal Regulations, Federal Aviation Administration, DOT, "Emergency Landing Dynamic Conditions", Jan. 1, 2011, Title 14, Section 25.562.
(Continued)

*Primary Examiner* — Jessica B Wong
(74) *Attorney, Agent, or Firm* — Suiter Swantz pc llo

(57) ABSTRACT

A gravity-assisted tracking base assembly for an aircraft seat includes base rails mounted to floor tracks in an aircraft cabin by floor track fittings in fixed positions, the base rails connected by a tracking member for providing longitudinal tracking while minimizing added height. The base rails include tracking slots extending longitudinally, and the tracking member includes tracking elements translatable forward and backward along the tracking slots, allowing an aircraft seat mounted to the tracking member to translate forward and backward relative to the base. The tracking member includes a locking mechanism for locking the tracking member and seat in intermediate positions within the tracking slots. The tracking slots may be oriented slightly downward from the horizontal to allow for gravity-assisted tracking or to counteract the nose-up flight angles associated with cruising altitude, providing for easier seat tracking.

13 Claims, 9 Drawing Sheets

(56) References Cited

U.S. PATENT DOCUMENTS

| | | |
|---|---|---|
| 9,481,467 B2 | 11/2016 | Oleson |
| 11,338,922 B2 * | 5/2022 | Oleson ............... B64D 11/0648 |
| 2001/0033101 A1 | 10/2001 | Plant |
| 2010/0124457 A1 | 5/2010 | Cook et al. |
| 2014/0133899 A1 | 5/2014 | Huang |
| 2014/0191081 A1 | 7/2014 | Ward et al. |
| 2015/0210394 A1 | 7/2015 | Joffre |
| 2016/0280378 A1 | 9/2016 | Le |
| 2021/0221520 A1 | 7/2021 | Oleson |

OTHER PUBLICATIONS

Search Report dated Jan. 7, 2019 for EP Patent Application No. 18193958.8.

* cited by examiner

GRAVITY-ASSISTED TRACKING BASE ASSEMBLY FOR AIRCRAFT SEAT

CROSS-REFERENCE TO RELATED APPLICATIONS

The present application is a divisional application of U.S. patent application Ser. No. 15/702,324 and entitled TRACKING BASE ASSEMBLY FOR AIRCRAFT SEAT, filed Sep. 12, 2017, which is incorporated herein by reference in its entirety.

BACKGROUND

Aircraft seats may be mounted into an aircraft cabin via floor tracks running longitudinally (e.g., substantially parallel to the roll axis of the aircraft) along the aircraft floor, aft to forward. Each seat may be mounted to two substantially parallel tracks. For example, an individual aircraft seat may be mounted to the cabin at four points, e.g., a forward point and rear point along both a left and right track. The aircraft seat may be configurable to adjust between a substantially upright configuration (e.g., a taxi, takeoff and landing (TTL) position), one or more reclining configurations, and a berthed configuration wherein the seat reclines fully for sleeping. The seat may additionally track forward (e.g., move longitudinally forward without reclining) or rotate (e.g., around a vertical axis or z-axis parallel to the yaw axis of the aircraft). If a seat is mounted directly in front of a bulkhead, the seat may be configured to recline and/or track without interference from the bulkhead.

Conventional aircraft seating assemblies may achieve these reclining and tracking objectives via a system of sliding rails. However, the tracking mechanisms necessary for such tracking operations may add height to a seating assembly that must fit into a compact aircraft cabin with limited vertical space. Additionally, extended tracking may lead to critical interface loading: for example, as the seat tracks full forward, the left and right rear mounting points may track forward as well, reducing the distance between the front and rear mounting points. As a result, the occupant may be required to vacate the seat when converting to a berthed or full-forward tracked configuration. Further, once in the berthed configuration, the occupant may be able to use the seat only as a bed rather than as a conventional seat.

Furthermore, seat tracking operations may be complicated by the fact that cruising aircraft tend to maintain a flight angle (e.g., pitch angle) slightly above the horizontal, or nose-up. As a result, occupants of manual forward-facing seats (wherein, for example, the occupant manually tracks the seat by pushing or "walking" the seat forward or backward with their feet) may be required to track their seats slightly "uphill", expending extra effort to account for the few degrees of nose-up flight angle. Similarly, aft-facing seats may tend to "run away", or naturally track forward, due to a combination of gravity and the nose-up flight angle.

SUMMARY

In one aspect, embodiments of the inventive concepts disclosed herein are directed to a gravity-assisted tracking base assembly for an aircraft seat. In embodiments, the tracking base assembly includes two base rails mountable to the floor of the passenger cabin. Each base rail includes a tracking slot set thereinto, e.g., between a starting tracking position and a terminal tracking position (e.g., associated with an aircraft seat tracked maximally forward of the base assembly). Each tracking slot is set at an angle to the horizontal (e.g., at an acute angle toward, or away from, the cabin floor). A tracking member connects the base rails; the tracking member has a top or upper surface to which the aircraft seat is mounted, allowing the aircraft seat to track back and forth relative to the base assembly. The tracking member connects to the base rails via one or more tracking elements capable of translating along the tracking slots between the starting and terminal tracking positions (and at various intermediate tracking positions therebetween). A locking assembly secures the tracking elements (and thus the aircraft seat) at these intermediate positions.

In some embodiments, the tracking slots are aligned at a downward angle relative to the horizontal (inclined nose-down or toward the floor).

In some embodiments, the tracking slots are aligned at an angle of no more than 5 degrees to the horizontal.

In some embodiments, the locking assembly is activated and deactivated by an electronic actuator.

In some embodiments, the tracking elements include sliding components, bearing components, or rolling components.

In some embodiments, the base rails have inside and outside surfaces, the inside surfaces facing each other and including the tracking slots set thereinto.

In some embodiments, the tracking slots extend all the way through the base rails from the inside surfaces to the outside surfaces.

In some embodiments, tracking limiters are set into the tracking slots for restricting the translation of the tracking member (and thus the aircraft seat) beyond the point where the tracking limiter is set.

In some embodiments, the tracking base assembly includes lateral (e.g., horizontal) crossing spars for connecting and stabilizing the base rails.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
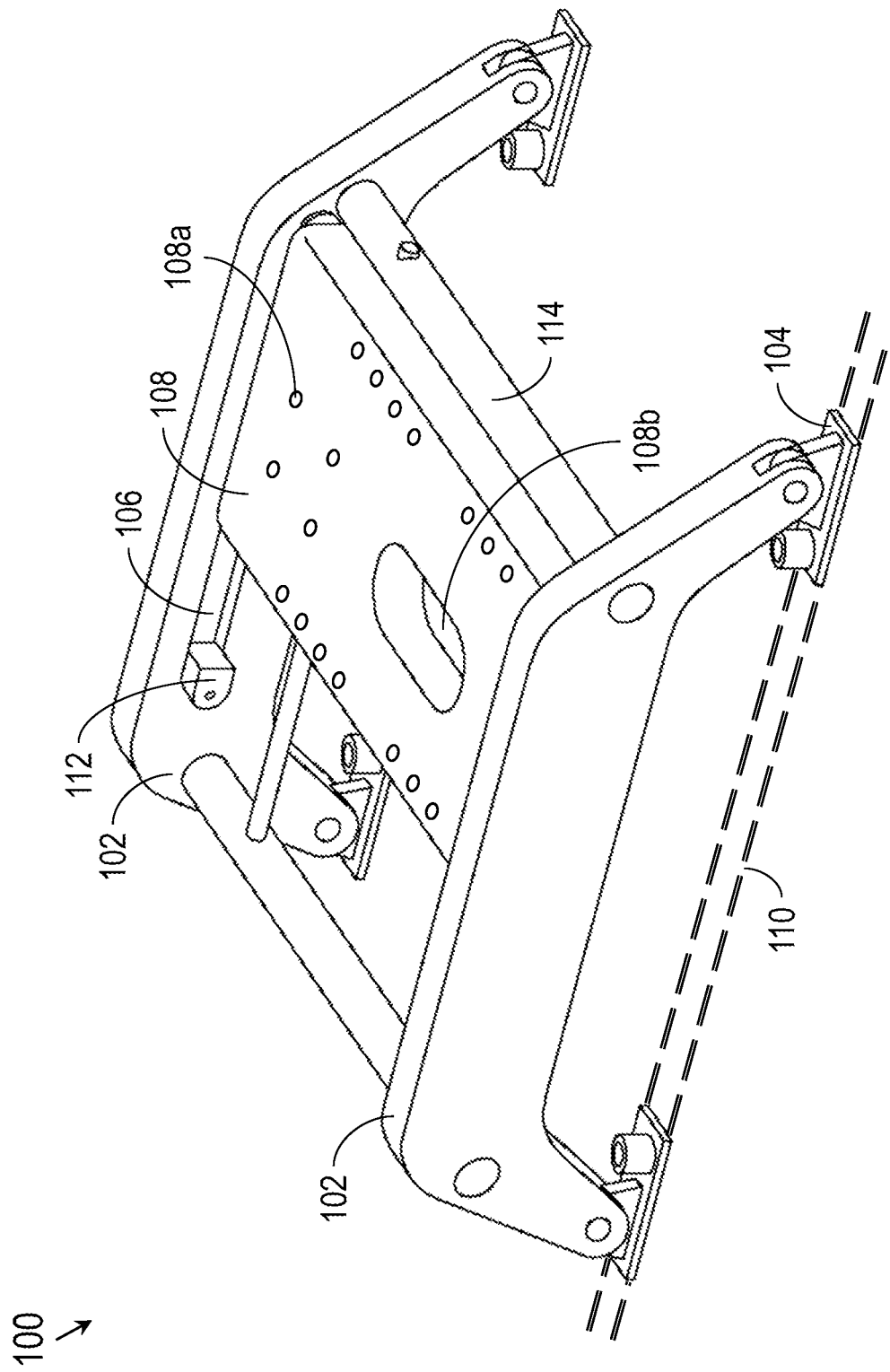
FIG. 1 is an overhead perspective view of an exemplary embodiment of a tracking base assembly according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a tracking base assembly for an aircraft seat that provides extended longitudinal tracking without adding excessive height to the seating assembly. The tracking base assembly is mounted to the aircraft floor at fixed positions regardless of the tracking distance, maintaining optimal distribution of interface loads. The tracking base assembly may further incorporate tracking slots machined downward to provide gravity-assisted tracking on level ground and compensate for nose-up flight angles commonly associated with flight segments at cruising altitudes.

Figure 7A:
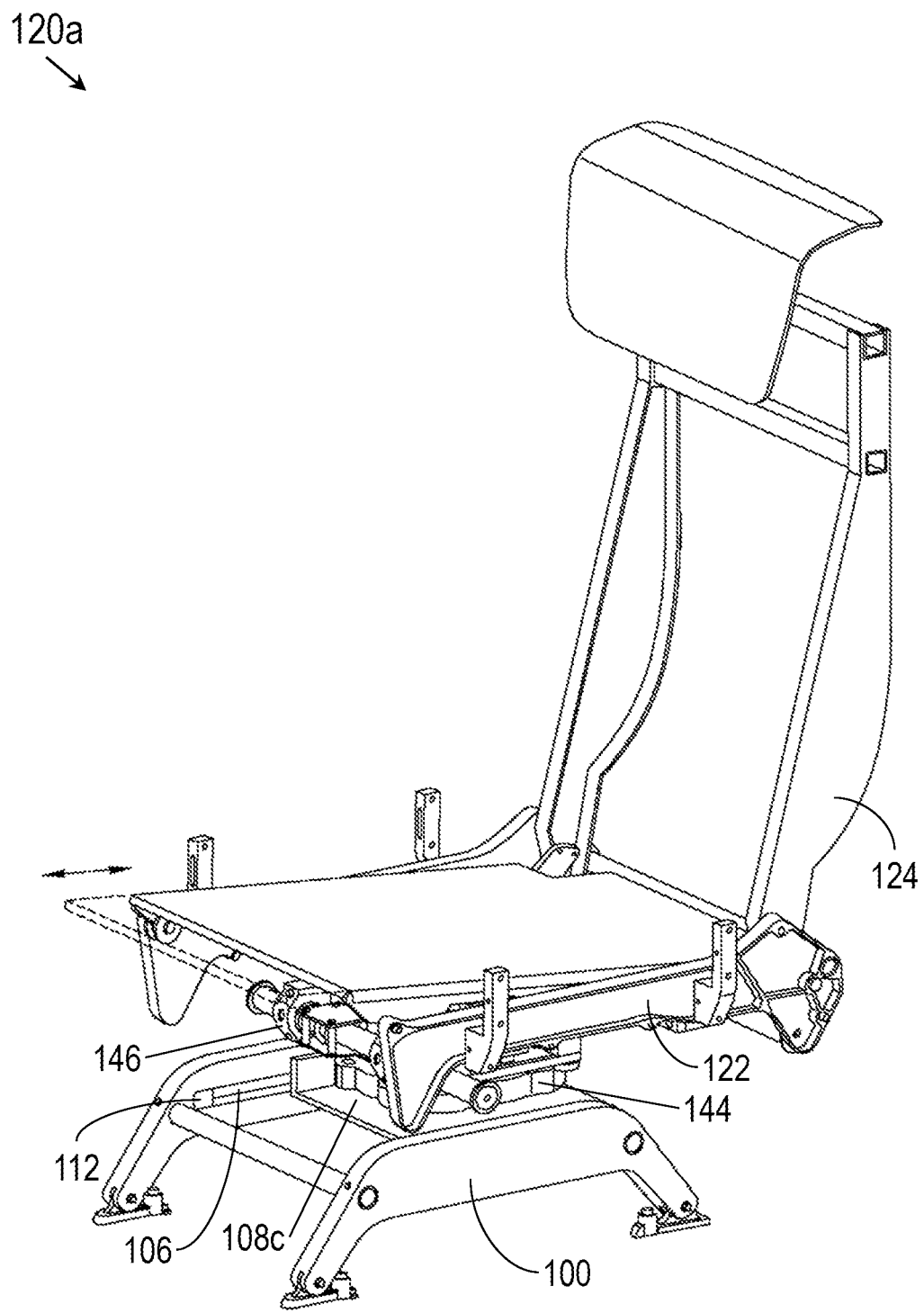
FIG. 7A is an overhead perspective view of an aircraft seating assembly according to embodiments of the inventive concepts disclosed herein.

Referring to FIG. 1, an exemplary embodiment of a tracking base assembly 100 according to the inventive concepts disclosed herein may include base rails 102 secured to the floor of an aircraft by floor track fittings 104 and having tracking slots 106, the base rails 102 connected and held in spaced apart relations by a tracking member 108. The tracking member 108 may translate longitudinally (e.g., substantially parallel to a longitudinal axis, or roll axis, of the aircraft) to move an aircraft seat frame mounted to the tracking member 108 forward and backward (relative to the longitudinal axis) between retracted and extended positions. The tracking member 108 may include a tracking box (e.g., a torsion box) incorporating internal structuring to prevent twisting moments. The tracking member 108 may include holes (108a) in its top surface to allow for the mounting of, e.g., a swivel or extended tracking module in a variety of configurations and positions relative to the tracking member. The tracking member 108 may include one or more recesses (108b) to allow for the mounting of a swivel, an extended tracking module, or other components to the tracking member without adding height to the seating assembly. The tracking member 108 may include a U-shaped member, a box, or a tracking plate (e.g., as shown by FIG. 7A/B).

The base rails 102 may be attached to floor tracks (110) in the floor of the aircraft by floor track fittings 104. Each floor track fitting 104 may be capable of multiple degrees of freedom in order to react appropriately to, e.g., the floor deformation required per 14 CFR 25.562(b)(2). While conventional seating assemblies may, for example, translate a seat frame forward (e.g., for reclining or berthing seating configurations) by extending forward one or more connectors by which the seat frame is mounted to the aircraft floor, the base rails 102 remain in fixed positions (defined by the floor track fittings 104) during normal operations and transitions between retracted, extended, and berthing configurations.

The tracking member 108 may be mounted between the base rails 102; the top surface of the tracking member (to which a seat frame may be mounted) may be parallel to, or below, the top surface of the base rails 102, enabling the tracking base assembly 100 to provide seat tracking functionality without adding height to the seating assembly. For example, the base rails 102 may include tracking slots 106 set into their inner surfaces, such that opposing base rails may include opposing tracking slots through which the tracking member 108 may translate backward and forward (e.g., to translate backward and forward a seat frame mounted to the tracking member).

The mobility of the tracking member 108 may be defined by the length of the tracking slots 106, or tracking limiters (112) may be set into the tracking slots 106 to further restrict the tracking member to a predetermined distance short of the maximum length of the tracking slots 106. For example, the tracking base assembly 100 may be limited by the tracking limiters 112 to create a "staggered" installation configuration in order to increase diagonal aisle width between individual seats and support aircraft egress. The base rails 102 may be connected to each other, and further stabilized, by lateral crossing spars 114 (e.g., cross-tubes, cross-bars).

Figure 2:
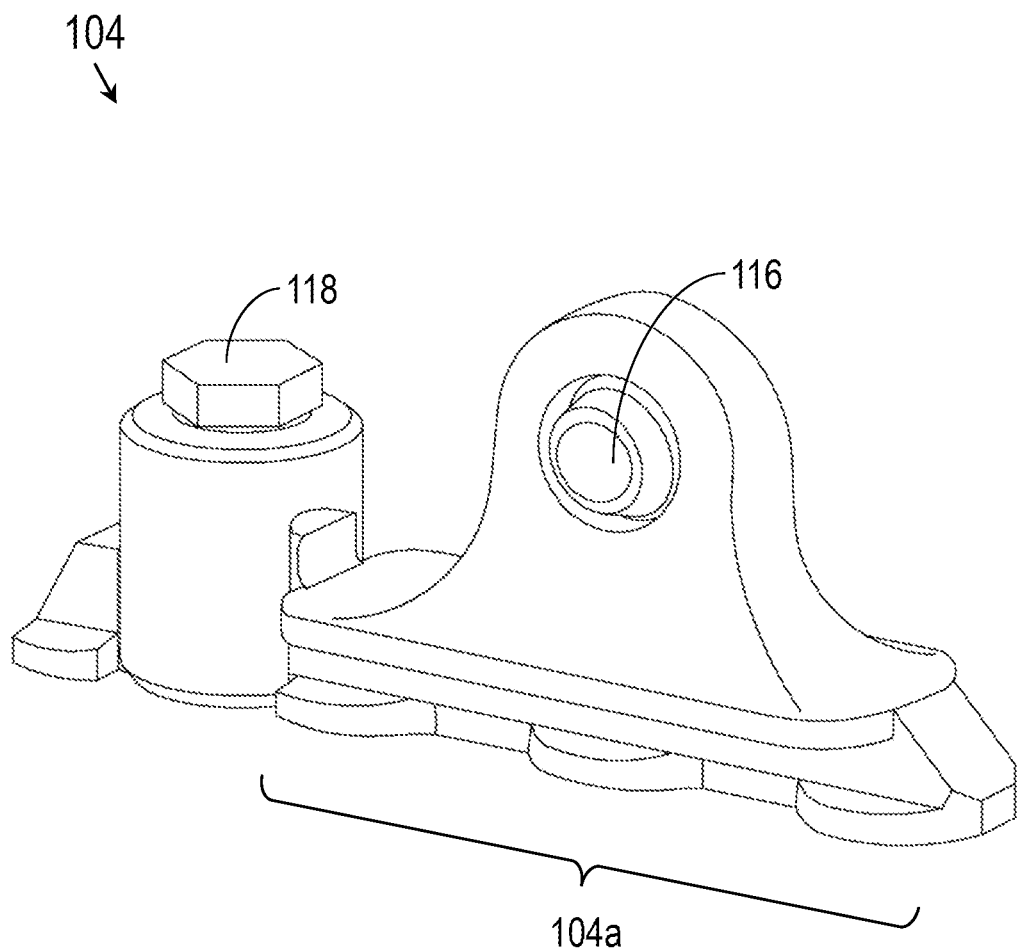
FIG. 2 is an overhead perspective view of a floor track fitting of the tracking base assembly of FIG. 1.

Referring now to FIG. 2, the floor track fitting 104 shown by FIG. 1 may include a base rail attachment 116 (e.g., trunnion mount) by which the base rails (102, FIG. 1) attach to the floor track fitting 104. Shear retainers 118 (e.g., threaded bolts) may vertically secure the floor track fitting 104 to its fixed position in the floor track (110, FIG. 1). The floor track fitting 104 may be contoured (104a) to securely align with a seat track or track crown system, e.g., a system as disclosed by commonly owned U.S. Pat. No. 9,481,467, which is herein incorporated by reference in its entirety. For example, the contours 104a of the floor track fitting 104 may conform to holes or openings in the floor track 110, securing the floor track fitting in its fixed position.

Figure 3:
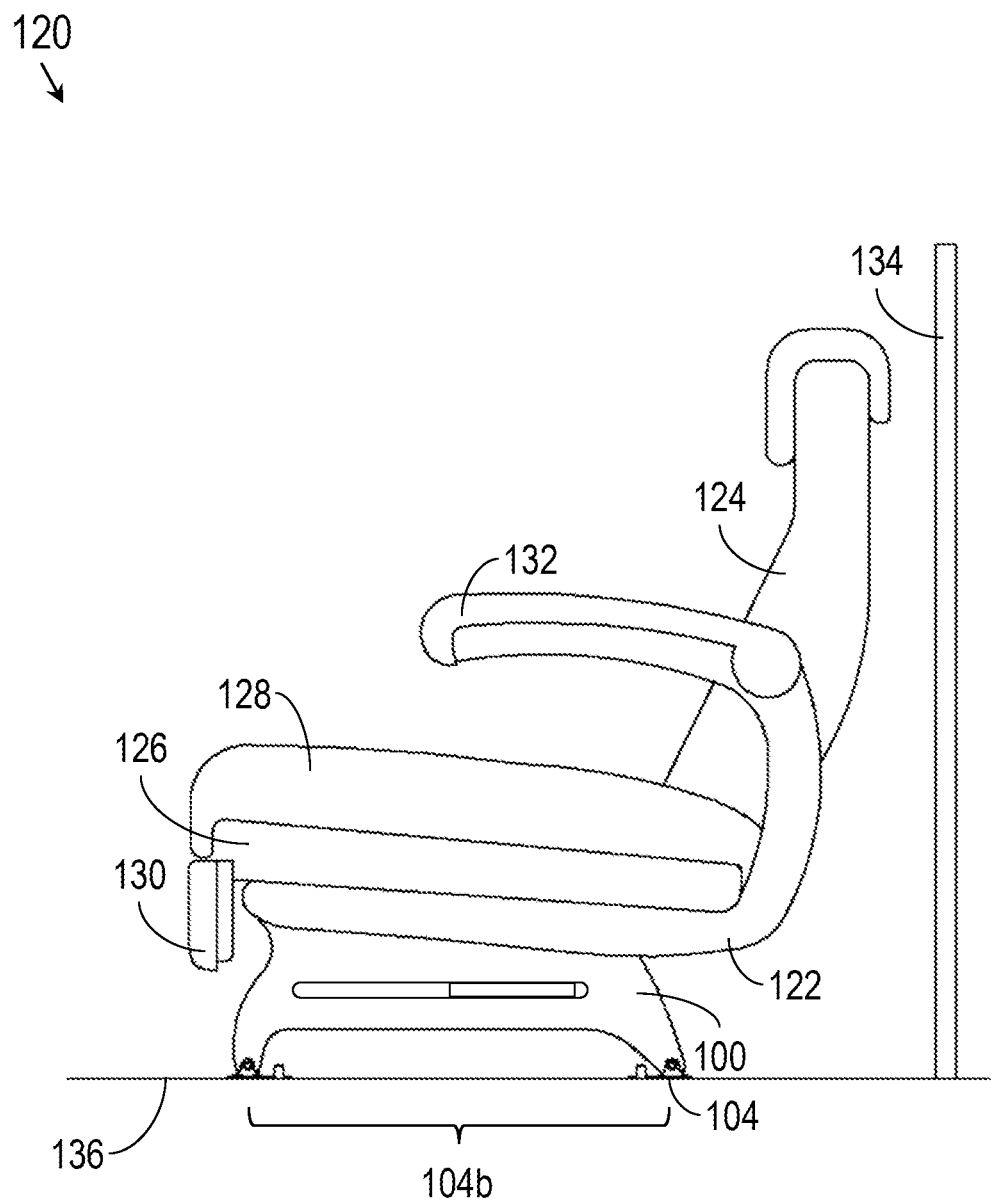
FIG. 3 is a left-side profile view of an aircraft seat in a retracted configuration incorporating the tracking base assembly of FIG. 1.

Referring now to FIG. 3, an aircraft seat 120 may include a seat frame (122), seatback 124, seatpan 126, seat cushion 128, footrest 130, and/or armrest 132 mounted to the tracking base assembly 100. For example, if the aircraft seat 120 is mounted at the rear of an aircraft cabin in close proximity to a bulkhead 134, the tracking base assembly 100 may provide for extended translation of the aircraft seat 116 (e.g., to a reclined or berthed configuration) without interference from the bulkhead 134. Furthermore, the tracking base assembly 100 may remain fixed to the aircraft floor (136) as the aircraft seat 120 translates, without reducing the distance (104b) between individual floor track fittings 104. Accordingly, the aircraft seat 120 may more efficiently distribute interface loads to the floor tracks (110, FIG. 1) than conventional tracking seats.

Figure 4A:
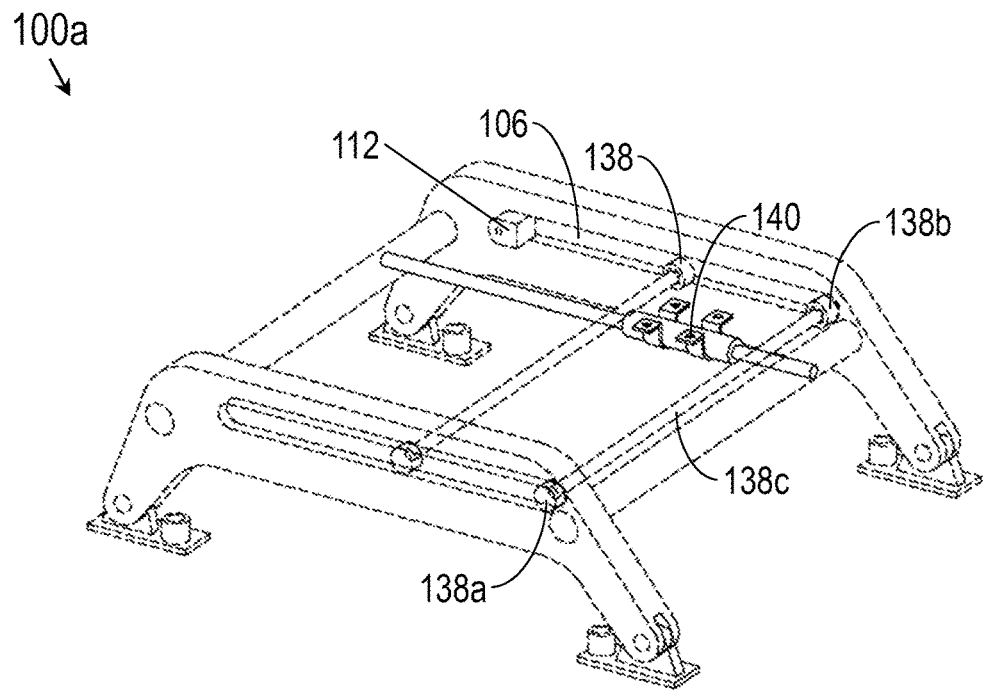
FIGS. 4A and 4B are overhead perspective views of the tracking base assembly of FIG. 1.
Figure 4B:
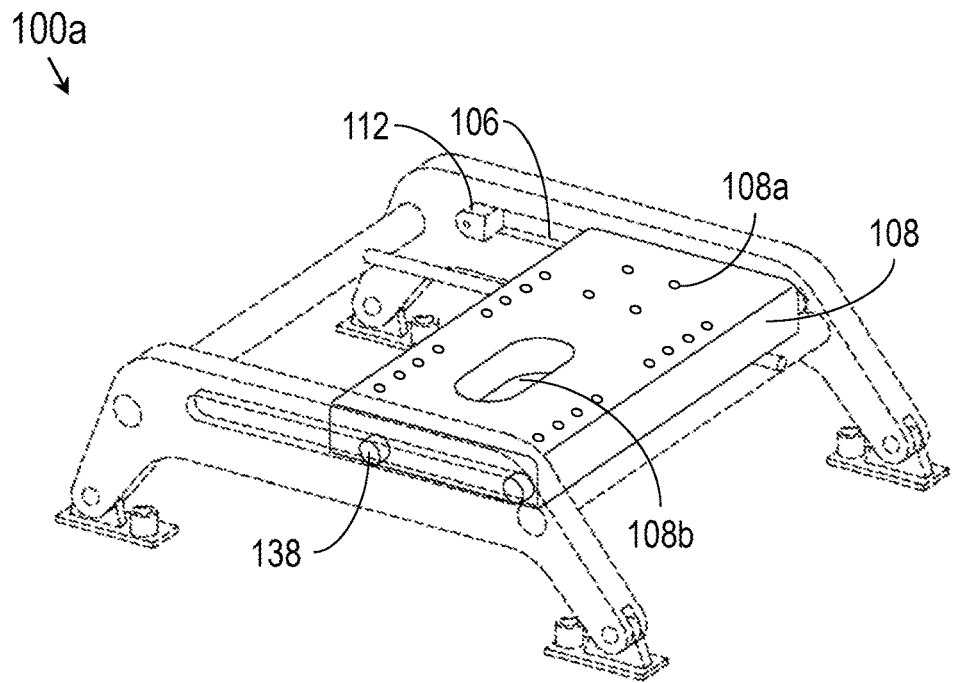

Referring now to FIGS. 4A and 4B, the tracking base assembly 100a may be implemented and may function similarly to the tracking base assembly 100 of FIG. 1, except that the tracking base assembly 100a may include tracking elements 138 (e.g., tracking elements) via which the tracking member 108 translates back and forth through the tracking slots 106 (which tracking distance may be limited by tracking limiters 112). For example, the tracking elements 138 may be rolling, sliding, or bearing elements compatible with the tracking slots 106, or may be slidably and fixedly held in spaces-apart relation via, e.g., a rack and pinion or keyhole slots. The tracking elements 138 may comprise paired elements (138a-b) joined by a common axle 138c within the tracking member 108. Referring in particular to FIG. 4B, the tracking member 108 may include a variety of mounting holes (108a) or recesses (108b) fully or partially set into the tracking member 108 to allow for the mounting of the seat frame (122, FIG. 3), a swivel, an extended tracking module, or other components in a variety of configurations and orientations, allowing the aircraft seat (120, FIG. 3) to rotate as well as translate without adding excess height to the aircraft seat.

The tracking member 108 may include a locking assembly 140 for "locking" or securing the tracking member 108 at any desired position along the tracking slots 106. The locking assembly 140 may include a mechanical locking device (for example, a Mechlok® locking device (as provided by Porter Systems, Inc., and as disclosed by, e.g., U.S. Pat. No. 5,441,129), a spring-loaded pin lock, or a gear and rack lock) for securing the tracking member 108 at a number of possible discrete incremental positions, rather than at any point along the tracking slots 106. The locking assembly 140 may include electronic or hydraulic actuators, e.g., controllable by the seat occupant, for power-assisted seat tracking via the tracking base assembly 100. The locking assembly 140 may include a spring plunger for easily changing the tracking range of the tracking member 108.

Figure 5A:
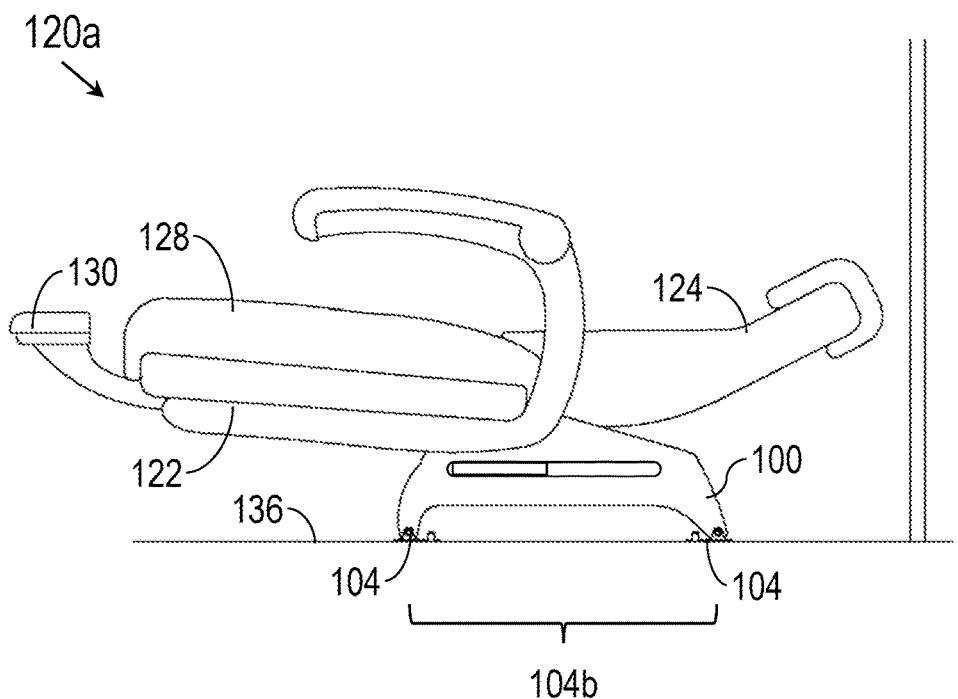
FIGS. 5A and 5B are respectively left-side profile and overhead perspective views of the aircraft seat of FIG. 3 in a berthed configuration.
Figure 5B:
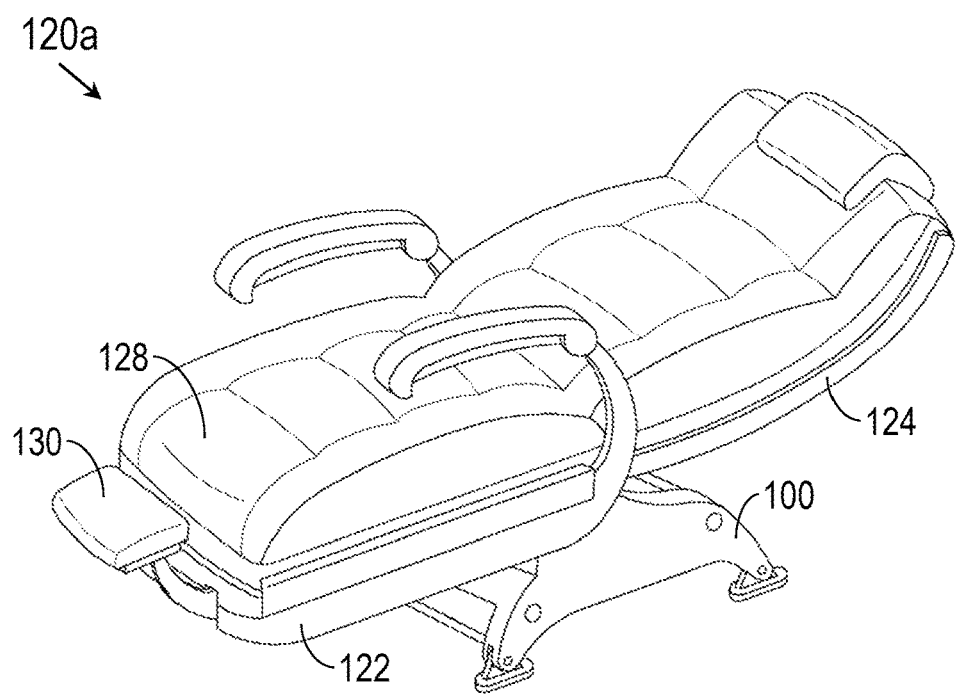

Referring now to FIGS. 5A and 5B, the aircraft seat 120a may be implemented and may function similarly to the aircraft seat 120 of FIG. 3, except that the aircraft seat 120a may be extended forward (via the tracking base assembly 100) into a berthed (e.g., fully extended) configuration wherein the seatback 124, seat cushion 128, and footrest 130 are substantially parallel and provide a fully reclined sleeping position for the occupant of the aircraft seat 120a. As previously noted, the separation (104b) between the floor track fittings 104 (via which the tracking base assembly 100, and thus the aircraft seat 120a, is mounted to the aircraft floor 136) remains consistent. Accordingly, the interface load distribution of the aircraft seat 120a remains balanced such that the occupant of the aircraft seat 120a may remain seated during extended tracking to the berthing configuration (from, e.g., the retracted configuration shown by FIG. 3), and the occupant may use the aircraft seat 120a either as a berth or as a seat.

Figure 6A:
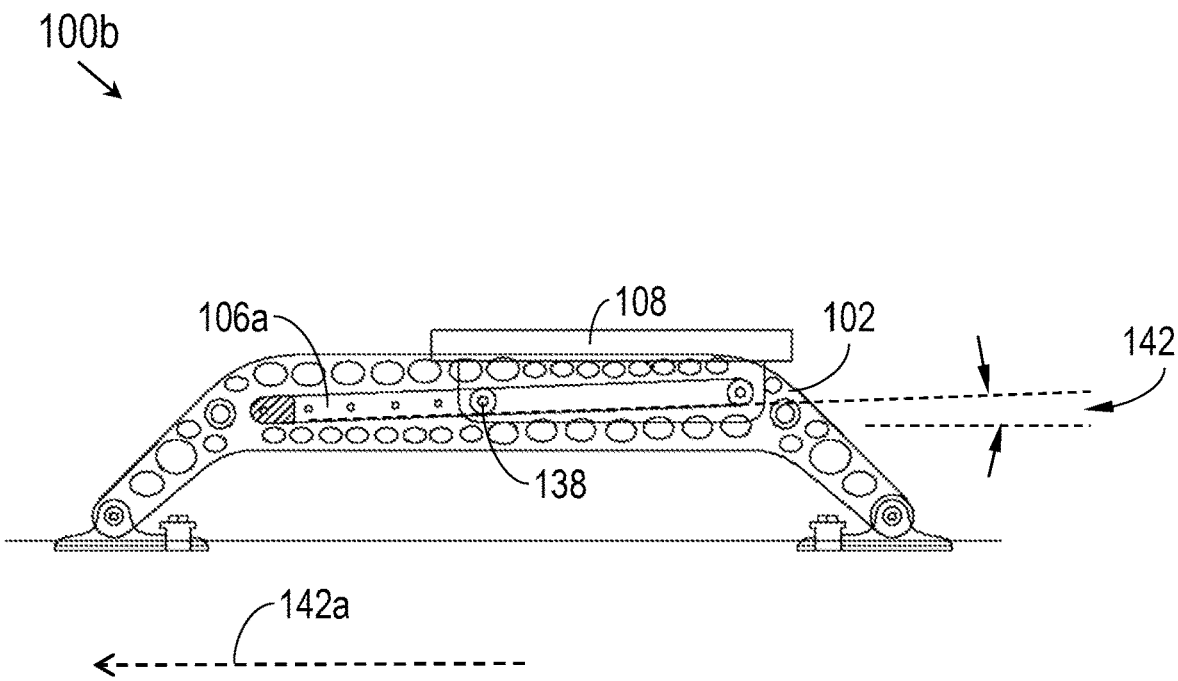
FIGS. 6A and 6B are left-side cross-section views of a tracking base assembly according to embodiments of the inventive concepts disclosed herein.
Figure 6B:
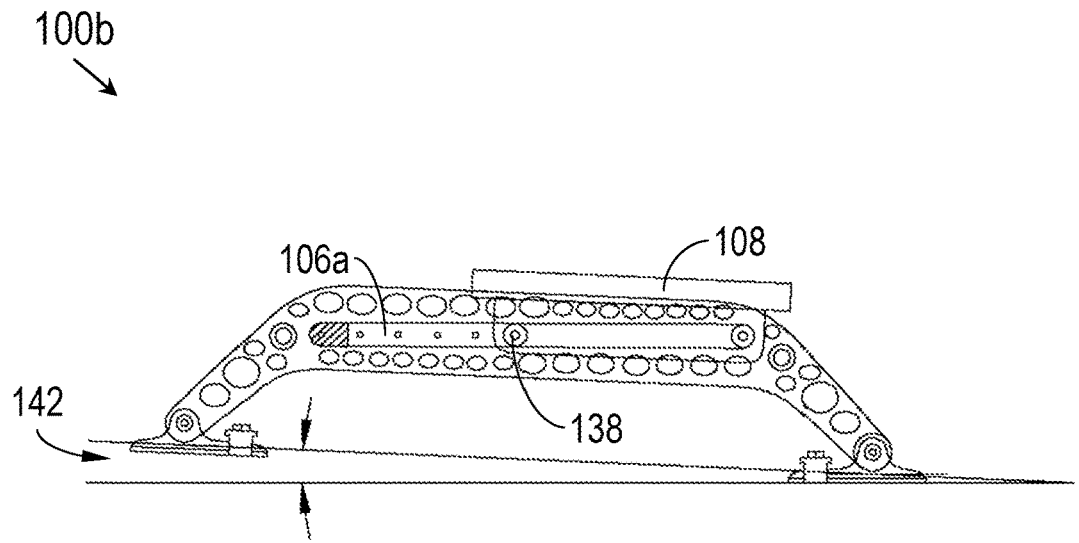

Referring now to FIGS. 6A and 6B, the tracking base assembly 100b may be implemented and may functions similarly to the tracking base assembly 100, 100a of FIGS. 1 and 4A, except that the tracking base assembly 100b may include base rails 102 wherein the tracking slots (106a) are oriented or machined nose-down (142, FIG. 6B; e.g., 3 degrees below the horizontal, or the roll axis of the aircraft) with respect to forward tracking 142a (e.g., toward the front of the cabin, for a forward-facing seat). Manually operated aircraft seats may require the occupant to push or pull the seat forward (e.g., from a retracted position, as shown by FIG. 3, into a reclined position) by "walking" the seat forward with their feet. On a level aircraft, the nose-down orientation of the tracking slots 106a may allow gravity-assisted forward tracking when the locking assembly (140, FIG. 4A) is released, allowing the tracking member 108 to more easily translate through the tracking slots 106a via the tracking elements 138. On an inflight aircraft, the nose-down orientation of the tracking slots 106a may cancel the nose-up flight angle of the aircraft, allowing for level seat tracking at cruising altitude (rather than the "uphill" tracking that would result from the combination of horizontal tracking slots and a nose-up flight angle). Similarly, aft-facing aircraft seats would be prevented from "running away" while inflight, as the aft-facing seat would not be subjected to the combination of horizontal tracking shots and a nose-up flight angle leading to the seat tending to track forward, following gravity.

Referring now to FIG. 7A, the aircraft seat 120a and tracking member 108c may be implemented and may function similarly to the aircraft seat 120 of FIG. 3 and tracking member 108 of FIG. 1, except that the tracking member 108c may be a platform configured to accommodate a swivel 144 and an extended tracking module 146 mounted to the tracking base assembly 100 (and to which the seat frame 122, seatback 124, and other components of the aircraft seat 120a may be mounted) while adding minimal height to the aircraft seat 120a. The swivel 144 may allow the aircraft seat to rotate around a vertical axis (e.g., z-axis; substantially parallel to the yaw axis of the aircraft). The extended tracking module 146 may allow the aircraft seat 120a to track laterally as well as longitudinally (as opposed to the longitudinal tracking of the aircraft seat 120), or to track longitudinally beyond the limits provided by the tracking slots 106 (or by the tracking limiters 112 disposed therein).

Figure 7B:
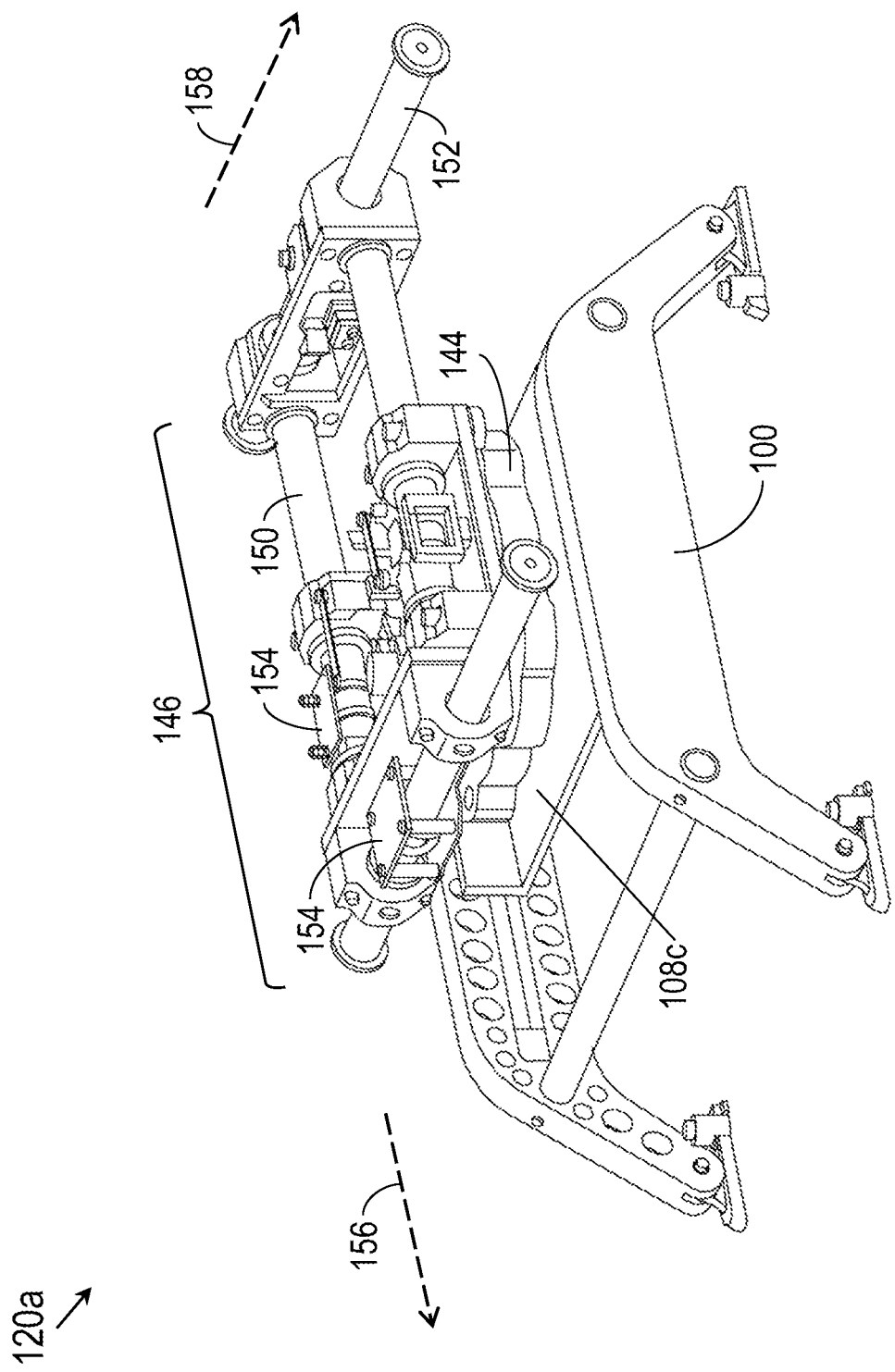
FIG. 7B is an overhead perspective view of the tracking base assembly of FIG. 7A.

Referring in particular to FIG. 7B, the extended tracking module 146 may include longitudinal rails 150 (e.g., parallel to the tracking slots 106) and lateral rails 152 (e.g., perpendicular to the longitudinal rails 150) such that when the seat frame (122, FIG. 7A) and other components of the aircraft seat 120*a* are mounted to the seat base/s (154) of the extended tracking module 146, the aircraft seat 120*a* may be tracked longitudinally (156) beyond the tracking limiter 112 or tracked laterally (158). The aircraft seat 120*a* may be tracked to additional angles if the swivel 144 is rotated to an acute angle (90 degrees or less) to the tracking slots 106.

Figure 8A:
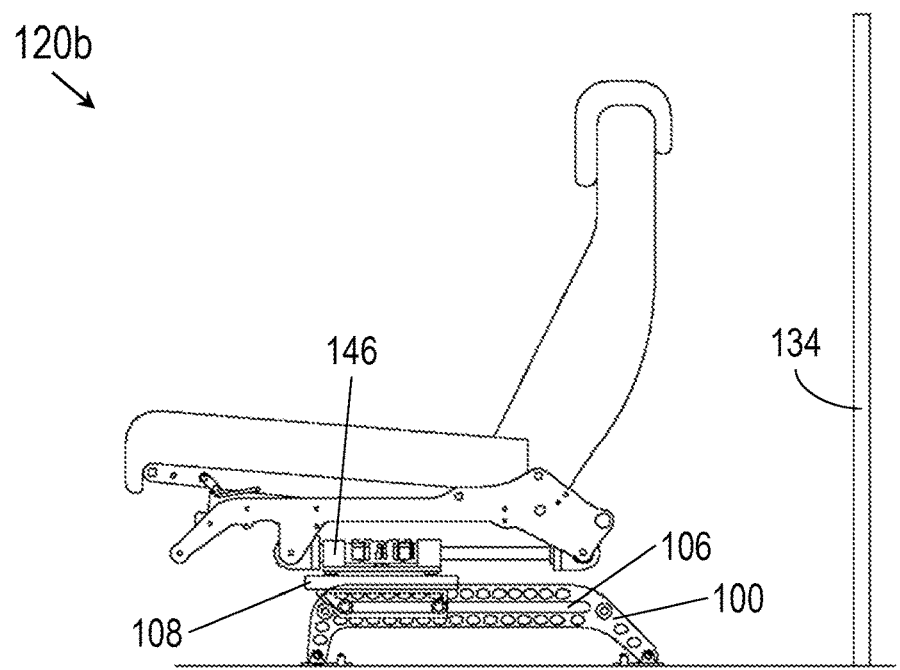
FIGS. 8A and 8B are left-side cross-section views of the aircraft seat of FIG. 7A in respectively an extended and further-extended configuration.
Figure 8B:
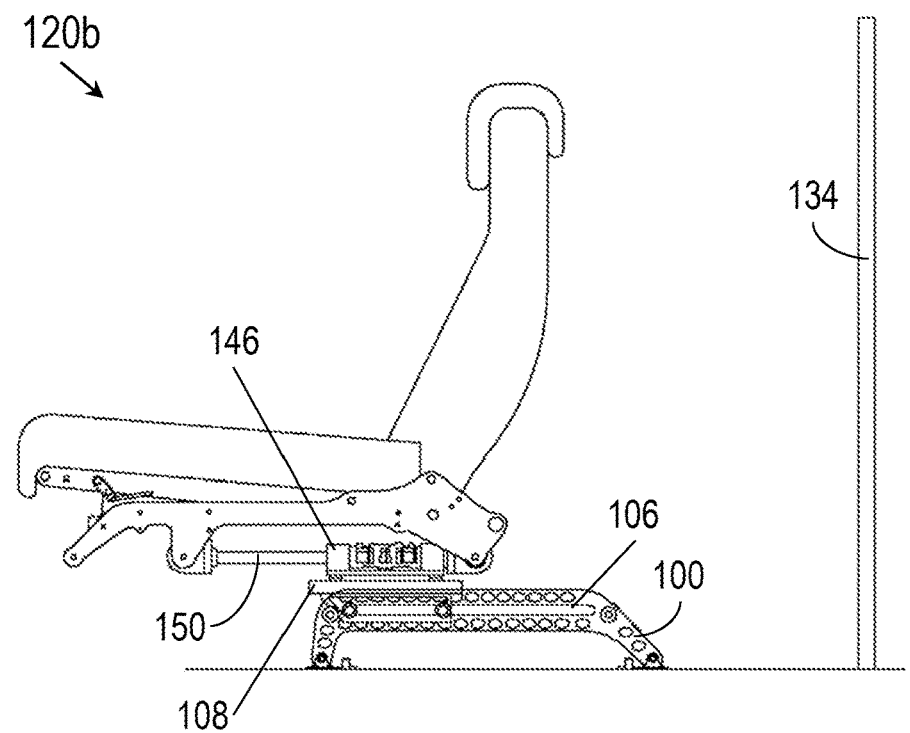

Referring to FIGS. 8A and 8B, the aircraft seat 120*b* may be implemented and may function similarly to the aircraft seats 120, 120*a* of FIGS. 3 and 7A, except that the aircraft seat 120*b* may track beyond the distance limit provided by the tracking slots 106 of the tracking base assembly 100. For example, the extended tracking module 146 may be mounted to the tracking member 108. The aircraft seat 120*b* may track forward (away from the bulkhead 134) toward the forward end of the tracking slots 106. Referring in particular to FIG. 8B, the aircraft seat 120*b* may track further forward via the longitudinal rails 150 of the extended tracking module 146 (e.g., in order to achieve a partially reclined or berthed configuration).

As will be appreciated from the above, systems and methods according to embodiments of the inventive concepts disclosed herein may provide for extended seat tracking without the interface load issues of conventional extended-tracking solutions and without adding excess height to seating assemblies configured to aircraft cabins of limited dimensions. Furthermore, the seat tracking process may be made easier for occupants by introducing gravity assistance or compensating for the nose-up flight angles associated with flight segments at cruising altitude.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

I claim:

1. A gravity-assisted tracking base assembly for an aircraft seat, comprising:
   two base rails configured for mounting to an aircraft floor, the floor substantially parallel to a longitudinal axis of the aircraft, each base rail having an upper surface and including a tracking slot extending between first and second tracking positions, the tracking slot oriented at an acute angle relative to the longitudinal axis;
   the two base rails connected and held in spaced apart relations by a tracking member comprising:
      a top surface configured to have an aircraft seat mounted thereto, the top surface extending between the two base rails;
      one or more pairs of tracking elements configured to translate along the tracking slots between the first and second tracking positions, each pair of tracking elements joined by a common axle within the tracking member;
      and
      a locking assembly configured to secure the tracking member between the first and the second tracking positions.

2. The gravity-assisted tracking base assembly of claim 1, wherein the acute angle is a downward angle relative to the longitudinal axis.

3. The gravity-assisted tracking base assembly of claim 1, wherein the acute angle is an angle not more than 5 degrees relative to the longitudinal axis.

4. The gravity-assisted tracking base assembly of claim 1, wherein the locking assembly includes at least one electronic actuator configured to activate and deactivate the locking assembly.

5. The gravity-assisted tracking base assembly of claim 1, wherein the one or more pairs of tracking elements are selected from a group including sliding components, bearing components, or rolling components.

6. The gravity-assisted tracking base assembly of claim 1, wherein:
   each base rail has an outside surface and an inside surface, the two or more inside surfaces facing each other and including the tracking slots.

7. The gravity-assisted tracking base assembly of claim 6, wherein the tracking slots extend from the inside surfaces to the outside surfaces.

8. The gravity-assisted tracking base assembly of claim 1, further comprising:
   at least one tracking limiter disposed within the tracking slots, the at least one tracking limiter configured to restrict the translation of the tracking member beyond at least one intermediate tracking point corresponding to the tracking limiter.

9. The gravity-assisted tracking base assembly of claim 1, further comprising:
   one or more lateral crossing spars configured to laterally connect and hold in spaced apart relations the two or more base rails.

10. The gravity-assisted tracking base assembly of claim 1, wherein the acute angle is an upward angle relative to the longitudinal axis.

11. The gravity-assisted tracking base assembly of claim 1, wherein the tracking base assembly is embodied in an aircraft seat, and wherein the aircraft seat further comprises:
   a seat frame;
   and
   a seatback and a seatpan attached to the seat frame;
   wherein the tracking base assembly is attached to the seat frame.

12. The gravity-assisted tracking base assembly of claim 11, wherein the aircraft seat further comprises:
   at least one swivel fixed to the tracking member;
   wherein the seat frame is pivotably mounted to the tracking member via the swivel, and the seat frame is configured for rotation relative to a z-axis of the swivel.

13. The gravity-assisted tracking base assembly of claim 11, wherein the aircraft seat further comprises:
   an extended tracking module coupled to the tracking member;
   wherein the seat frame is mounted to the extended tracking module;
   and wherein the extended tracking module is configured to:
      articulate the aircraft seat parallel to the longitudinal axis;
      and
      laterally articulate the seat frame perpendicular to the longitudinal axis.

* * * * *